Dec. 16, 1947.    H. H. PLATT    2,432,678
SAFETY DEVICE FOR TWIN ROTOR HELICOPTERS
Filed Feb. 28, 1945
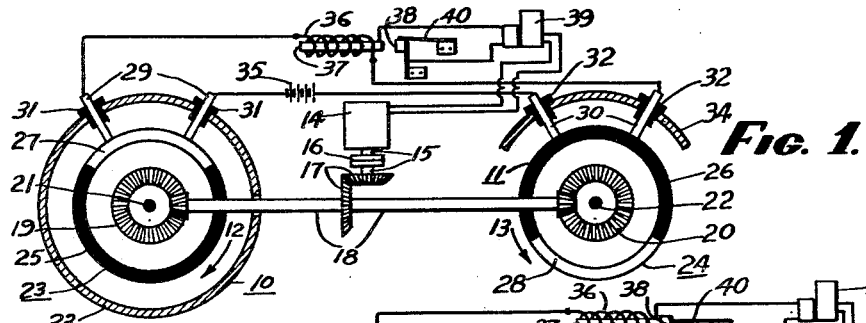
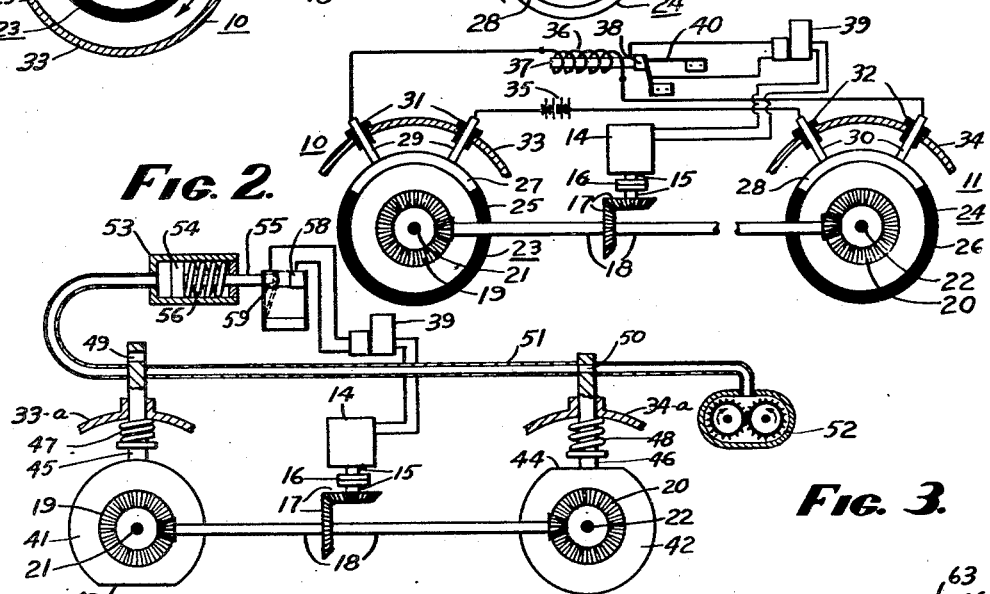
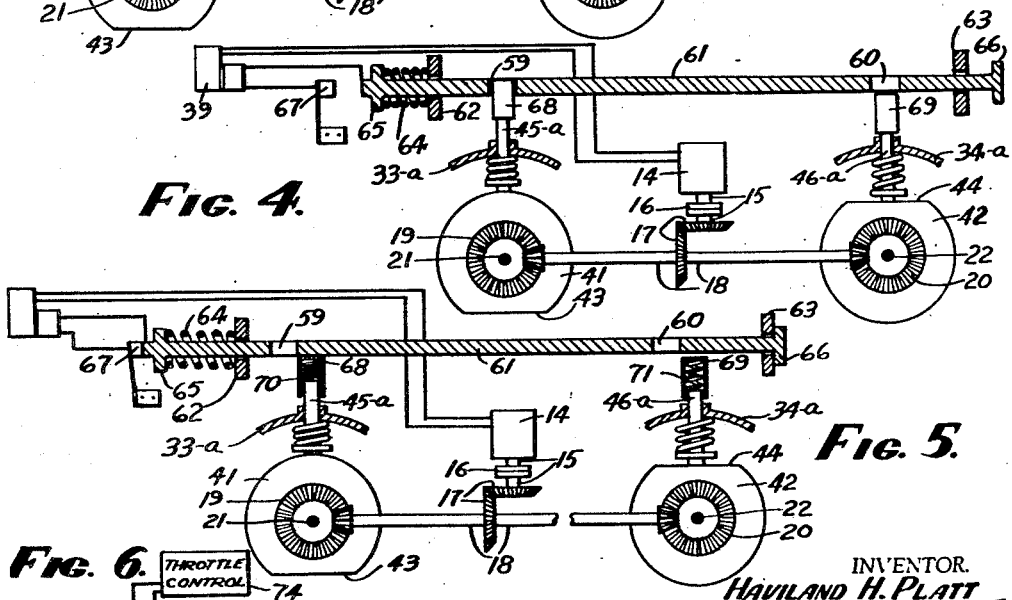
INVENTOR.
HAVILAND H. PLATT
BY Leonard L. Kalish Patented Dec. 16, 1947

2,432,678

UNITED STATES PATENT OFFICE 2,432,678

SAFETY DEVICE FOR TWIN ROTOR HELICOPTERS

Haviland H. Platt, New York, N. Y., assignor, by mesne assignments, to McDonnell Aircraft Corporation, St. Louis, Mo., a corporation of Maryland Application February 28, 1945, Serial No. 580,198

13 Claims. (Cl. 170—135.5)

1

The present invention relates to heavier-than-air rotating-wing aircraft and it relates more particularly to twin rotor helicopters.

An object of the present invention is to provide a novel safety device for twin rotor helicopers or the like. Another object of the present invention is to provide means for automatically shutting off the engine power in case of a failure of the transmission of either rotor, thereby to prevent upsetting or overturning of the helicopter and to permit the helicopter to descend gradually and upon an even keel with the two rotors autorotating.

Other objects and advantages of the present invention are apparent in the following detailed description, appended claims and accompanying drawings.

It has been customary, in the past, to provide helicopters with overrunning clutches for the lift rotors so that, in case of engine or transmission failure, the rotors may continue in autorotative rotation for power-off descent in safety. While such overrunning clutches are adequate in the case of single rotor helicopters, they do not fully protect a twin rotor helicopter from transmission failure. That is, while an overrunning clutch intermediate the engine and the rotors of a twin rotor helicopter would protect the craft against engine failure (since both rotors would be free for autorotation upon stopping of the engine), it would not protect the aircraft against accident resulting from failure of the power transmission mechanism of one rotor only.

Thus, if the power transmission mechanism of one rotor only were to fail, the rotor on the failed side would continue in autorotative rotation without power while increased power would be supplied to the other rotor which would still be connected to the engine. The result would be a violent upsetting tendency about the horizontal axis of the helicopter toward the damaged rotor which could result in a serious accident if the engine power were not instantaneously cut off (to permit both rotors to continue in autorotative rotation). Indeed, a delay of even a few seconds in the cutting off of the engine power could easily result in throwing the helicopter entirely out of control.

Accordingly, the present invention contemplates novel mechanism for automatically shutting off the engine power in case of a failure of the transmission to either rotor; the helicopter thus being protected against overturning and both rotors being left free to autorotate in the same manner as would be the case if the original

2 failure had been in the engine rather than in the transmission of one of the rotors.

For the purpose of illustrating the invention, there are shown in the accompanying drawings forms thereof which are at present preferred, although it is to be understood that the various instrumentalities of which the invention consists can be variously arranged and organized and that the invention is not limited to the precise arrangements and organization of the instrumentalities as herein shown and described.

Referring to the accompanying drawings in which like reference characters indicate like parts throughout:

Figure 1 represents a schematic plan view of one embodiment of the present invention showing the parts as they appear during normal power-on rotation of the two rotors.

Figure 2 represents a view generally similar to that of Figure 1 but showing the parts as they appear after the transmission to the right hand rotor has failed and after the mechanism has operated to shut off the engine.

Figure 3 represents a view generally similar to that of Figure 1 but showing another embodiment of the present invention employing a hydraulic system in place of the electrical system of Figure 1.

Figure 4 represents a view generally similar to that of Figure 1 but showing still another embodiment of the present invention employing a mechanical system in place of the hydraulic system of Figure 1.

Figure 5 represents a view generally similar to that of Figure 2 but showing the embodiment of Figure 4 with the parts in position after the transmission to the right hand rotor has failed and after the device has operated to shut off the engine power.

Figure 6 represents a fragmentary view generally similar to those of Figures 1 and 3 but showing still another embodiment of the present invention.

In one embodiment of the present invention shown generally in Figures 1 and 2, the rotor hub driving mechanisms of the two side-by-side rotors of a twin-rotor helicopter are shown schematically and are indicated generally by the reference characters 10 and 11; the rotor hub driving mechanisms operating normally to rotate the two rotors (not shown) in the direction of the arrows 12 and 13 respectively.

The rotors are adapted to be driven at equal speed by the engine 14 through the longitudinal shafting 15, the overrunning clutch 16, the bevel gear set 17, the transverse shafting 18 and bevel reduction gear sets 19 and 20 which drive the rotor spindles rotating about the axes 21 and 22.

In the embodiment of Figures 1 and 2, contact rings 23 and 24 are mounted by any suitable means, to rotate at all times with their respective rotor spindles about axes 21 and 22. The contact rings 23 and 24 are provided with insulating segments 25 and 26 and conducting segments 27 and 28; the conducting segments 27 and 28 being smaller, in circumferential dimension, than the insulating segments 25 and 26.

Pairs of brushes 29 and 30 are mounted in insulating brush holders 31 and 32 carried by the fixed rotor hub cases 33 and 34 (or carried by any other suitable supporting structure) so as to maintain contact, at all times, with the rings 23 and 24 respectively.

The brushes 29 and 30 are mounted within a series circuit having a battery 35 (or other source of electrical potential) and the coil 36 of a magnetic relay having an armature 37. A contact member 38 is mounted adjacent the relay and is normally spring-tensioned away from the end of the armature 37. The primary terminals of the engine magneto 39 are connected respectively to the armature 37 and the contact member 38. A spring latch member 40 serves to hold the contact member 38 in closed position, as shown in Figure 2, after actuation of the relay (in a manner to be hereinafter described) until manually released.

In normal operation, the gears of the two rotor hubs 10 and 11 are meshed so as to locate the contact rings 23 and 24 in the phase relationship shown in Figure 1. So long as the transmission elements remain intact, this relationship is positively maintained. Since the conducting segments 27 and 28 are shorter than the insulating segments 25 and 26, it is apparent that the two pairs of brushes 29 and 30 cannot, at any time, make simultaneous contact with their respective conducting segments 27 and 28. Since the pairs of brushes 29 and 30 are connected in a series circuit, it necessarily follows that the circuit remains open so that no current flows through the relay during normal operation of the rotors. Thus, so long as the transmission remains undamaged and the two rotors rotate together at the same rate of speed, the relay is not actuated.

However, in case of failure of the transverse shafting 18 on either side of the gear set 17, the two rotors are no longer positively geared to each other and begin to turn relative to each other.

For purposes of illustration, it will be assumed that the right hand side of the shafting 18 is broken so that power is no longer being transmitted to the right hand rotor hub system 11, as shown in Figure 2.

As stated above, as soon as this break occurs, the right hand rotor will start to lag relative to the left hand rotor and this lag will become more pronounced until the rotor hub 11 becomes displaced approximately one-half turn from the correct phase relationship shown in Figure 1, to the relationship shown in Figure 2.

When the rotor hubs 10 and 11 are in the relationship shown in Figure 2, both pairs of brushes 29 and 30 are in contact with their respective conducting segments 27 and 28 whereupon the series circuit is closed and current flows through the coil 36 of the relay. This causes the armature 37 to be magnetically energized in conventional manner to pull the contact member 38 against it as shown in Figure 2 (the latch member 40 then snapping down behind the contact member 38 to maintain it in closed position). When the contact member 38 touches the end of the armature 37, the magneto 39 is automatically short-circuited thereby to shut off the engine power; the power remaining off until the latch member is manually reset as described above.

When the engine power is thus shut off, the overrunning clutch 16 permits the left hand rotor to turn freely, as is well known in the art, so that both rotors continue in autorotative rotation to permit a safe power-off descent of the helicopter.

While, for purposes of illustration, I have shown two brushes for each rotor, it is possible to employ a single brush for each rotor if the conducting segments are grounded and if the battery is connected to the external circuit.

It is also possible to eliminate the spring latch member 40 if the relay is made sufficiently slow in releasing to ensure complete stopping of the engine before the short-circuit to the magneto is broken. Of course, once the engine has stopped completely, it will not re-start upon un-shorting of the magneto, unless and until the engine is "turned over" by the starting motor.

Where two magnetos are employed, both are connected across the armature 37 and the contact member 38 for simultaneous short-circuiting.

Other types of ignition systems can readily be connected for shutting-off of the engine power upon actuation of the relay, in ways readily apparent to those skilled in the art.

Instead of being used to shut off the ignition, actuation of the relay may be arranged to close the engine throttle, in ways readily apparent to those skilled in the art.

In Figure 3 I have shown another embodiment of the present invention wherein hydraulic pressure is employed as the actuating medium. In this embodiment, cam rings 41 and 42 are used in place of the contact rings 23 and 24 of the embodiment of Figures 1 and 2. Each of the rings 41 and 42 is formed with a depression or flat 43 and 44 respectively at one side thereof.

Valve plungers or cam-followers 45 and 46 are slidably mounted upon the housings or hub cases 33—a and 34—a; the plungers 45 and 46 being urged against the rings 41 and 42 by coil springs 47 and 48 respectively.

Ports 49 and 50 extend through the plungers 45 and 46 adjacent the free ends thereof. An oil tube 51 leads from a source of oil pressure, such as the engine oil pump 52, to one end of a cylinder 53 wherein a piston 54 is slidably mounted.

The free ends of the plungers 45 and 46 extend transversely through the oil tube 52; the ports 49 and 50 being in registration with the tube 51 when the plungers are in contact with the flats of the cam rings, and being out of registration with the tube 51 when the plungers are in contact with the arcuate portions of the cam rings.

The piston 54 is provided with a plunger 55 which extends outward from the end of the cylinder opposite the end to which the oil tube 51 is connected. A helical spring 56 is disposed about the plunger 55 and normally urges the piston 54 to its innermost position (toward the left in Figure 2).

A pair of resilient spaced electrical contacts 59 and 58 are mounted in alignment with the plunger 55; the plunger 55 being adapted to move the contact 59 against the contact 58 when said plunger is in its outermost position. When the plunger 55 is in its innermost position, it clears the contact 59 and permits the contacts to spring apart.

The primary terminals of the engine magneto 39 are connected across the contacts 59 and 58.

It is apparent that, when oil pressure from the pump 52 is transmitted through the tube 51 to the cylinder 53, the piston 54 will move toward the right in Figure 2 to close the contacts 59 and 58, thereby to short-circuit the magneto 39 and to shut off engine power. On the other hand, when some obstacle is introduced inside the oil tube 51 to prevent the oil pressure from being transmitted to the cylinder 53, the piston 54 will be kept in its left hand position by the spring 56 to permit the contacts 59 and 58 to remain apart so that the magneto 39 is not short-circuited.

In operation, the hub gears are so meshed that normally the flats 43 and 44 of the cam rings 41 and 42 are maintained in opposite phase relationship as shown in Figure 3. As the cam rings rotate, the plungers 45 and 46 reciprocate in opposite phase relationship so that the ports 49 and 50 are brought into and out of registration with the oil tube 51 at alternate times; the two ports never being in registration with the oil tube at the same time during normally meshed rotation of the hub gears and cam rings.

Thus, so long as the transmission remains intact to both rotors there is never any open connection from the pump 52 to the clylinder 53 so that there is never any oil pressure exerted against the piston 54.

However, should the drive to one rotor fail, there would no longer be any intermesh between the rotors whereup the cam rings 41 and 42 would rotate with changing phase relationship; the speed of the autorotating rotor with the broken transmission being less than that of the other rotor which is being driven at increased power.

It is apparent that, in very short order, the flats 43 and 44 will momentarily reach the same phase relationship whereupon the plungers 45 and 46 will reciprocate together in the same phase so that the two ports 49 and 50 will simultaneously come in registration with the oil tube 51. This will cause the hydraulic pressure within the cylinder 53 to build up so as to move the piston 54 to the right against the spring 56 whreupon the plunger 55 will force the contact 57 against the contact 58 so as to short-circuit the magneto 39 and to shut off the engine power.

The oil system should, preferably, be tight enough to maintain the extended position of the piston 54 and plunger 55 sufficiently long to ensure complete stopping of the engine. Alternately, it is possible to employ any conventional latch or locking mechanism (not shown) to retain the contact 59 in closed position; as for example, a spring latch member similar to the member 40 shown in Figures 1 and 2. Instead, any conventional locking mechanism (not shown) may be provided to retain the plunger 55 in its right hand extended position until manually released, so as to maintain the contacts 59 and 58 in closed position and to ensure stopping of the engine.

In Figures 4 and 5 I have shown another embodiment of the present invention wherein mechanical means are employed to shut off the engine power upon failure of the transmission to one of the rotors.

The construction of Figures 4 and 5 generally resembles that of Figure 3 in the provision of cam rings 41 and 42 having flats 43 and 44 thereon. However, the spring pressed valve plungers or cam-followers 45—a and 46—a, instead of having ports therethrough as in the embodiment of Figure 3, are made imperforate; the plungers 45—a and 46—a being adapted to reciprocate, in opposite phase relationship, into and out of openings 59 and 60 in an elongated shaft 61. The shaft 61 is slidably mounted upon supports 62 and 63 and is tensioned toward the left in Figures 4 and 5 by a helical spring 56 bearing against the support 62 and against the shoulder 65 formed adjacent the left end of said shaft 61. The movement of the shaft 61 toward the left is limited by a shoulder 66 formed at its right hand end which strikes against the support 63.

The primary terminals of the magneto 39 are connected across the left hand end of the shaft 61 and the spring contact 67.

When the rotor hubs and the cam rings are rotating in normal intermeshed relationship, the plungers 45—a and 46—a reciprocate in opposite phase reationship so that one of said plungers is always in extended position with its end within one of the openings 59 and 60. Thus, during normal operation of the rotors, the shaft 61 will always be retained in its right hand position, as shown in Figure 4. However, should the transmission to one rotor fail, the rotor hubs and cam rings will move out of registration so that, in very short order, the flats will be in the same relative position whereupon the plungers 45—a and 46—a will reciprocate in the same phase relationship. When this occurs, it is obvious that, momentarily, the ends of both plungers 45—a and 46—a will be withdrawn from the openings 59 and 60 at the same time whereupon the unrestrained shaft 61 will be driven toward the left by its spring 64 to the position shown in Figure 5 wherein its left hand end touches the contact 67 to short-circuit the magneto 39 and shut off the engine power.

In order to prevent damage to the plungers 45—a and 46—a during reciprocation subsequent to shifting of the shaft 61, I prefer to make their ends telescopic as shown schematically at 68 and 69 so that, when the plungers bear against the arcuate portions of the rings 41 and 42, their free ends, upon striking the shaft 61, will telescope slightly as shown in Figure 5 at 68. When the plungers come opposite the flats 43 and 44, their free ends will be returned to normal untelescoped position by small coil springs 70 and 71 as shown in Figure 5 at 69.

In Figure 6, I have shown another embodiment of the present invention employing plungers or cam-followers 45—b and 46—b generally similar to the plungers 45 and 46 of Figure 3 except that no ports are necessary therein. The plungers or cam-followers 45—b and 46—b are adapted for reciprocation in the same manner described hereinabove in connection with the embodiment of Figure 3; cam rings (not shown) identical with those of Figure 3 being employed.

In the embodiment of Figure 6, spaced pairs of resilient electrical contacts 72 and 73 are disposed above the plungers or cam-followers 45—b and 46—b respectively; the contacts being adapted to be pushed into contact (as shown at 73 in Figure 6) when the cam-followers are in their uppermost position, and being adapted to spring apart (as shown at 72 in Figure 6) when the cam followers are in their lowermost position.

The pairs of switches 72 and 73 are connected in a series circuit with the battery 35 and any conventional type of throttle control mechanism 74.

It is obvious that, during normal intergeared rotation of the rotor hubs, the cam followers 45—b and 46—b will reciprocate in opposite-phase relationship so that the circuit to the throttle control is always open.

However, upon failure of the transmission to one rotor, the cam-followers 45—b and 46—b will momentarily come into same-phase reciprocation to close the series circuit and to actuate the throttle control to stop the engine and to permit the helicopter to descend safely with the rotors in autorotative rotation.

The embodiments of Figures 3, 4, 5 and 6 may be modified in the same way as discussed above in connection with the embodiment of Figures 1 and 2 to shut off different types of engine ignition systems.

While, for purposes of simplicity, I have shown the contact rings 23 and 24 and the cam rings 41 and 42 as mounted directly on the rotor spindles, the present invention is not so limited. Thus, the rings 23 and 24 and the rings 41 and 42 may be mounted remotely from the rotor spindles and may be driven therefrom by any intermediate transmission means so as normally to maintain opposite phase relationship between the two rings when the rotors are geared together.

Where two or more engines are used to drive the side-by-side sustaining rotors, all of the engines should be connected to be simultaneously shut off upon operation of the novel safety device of the present invention.

The present invention may be embodied in other specific forms without departing from the spirit or essential attributes thereof, and it is therefore desired that the present embodiments be considered in all respects as illustrative and not restrictive, reference being had to the appended claims rather than to the foregoing description to indicate the scope of the invention.

Having thus described the invention, what I claim as new and desire to protect by Letters Patent is:

1. In a helicopter having an engine, a pair of side-by-side sustaining rotors, intergeared transmission means extending from said engine to each of said rotors whereby said rotors are adapted to be rotated by said engine at equal speed, and an overrunning clutch operatively disposed intermediate said engine and said rotors whereby said rotors are free to continue in autorotative rotation upon stopping of the engine; means for automatically shutting off the engine upon failure of the transmission to either rotor, said last-mentioned means including an asymmetrical element operatively connected with each rotor and adapted for rotation in positive phase relationship thereto, the asymmetries of said elements being maintained in phase disparity during normal power-on operation of said rotors, and mechanism interconnected with the engine controls and responsive to said asymmetrical elements, said mechanism being adapted to shut off the engine when the phase disparity between the two asymmetrical elements is nullified.

2. In a helicopter having an engine, a pair of side-by-side sustaining rotors, intergeared transmission means extending from said engine to each of said rotors whereby said rotors are adapted to be rotated by said engine at equal speed, and an overrunning clutch operatively disposed intermediate said engine and said rotors whereby said rotors are free to continue in autorotative rotation upon stopping of the engine; means for automatically shutting off the engine upon failure of the transmission to either rotor, said last-mentioned means including an asymmetrical element disposed for rotation with each rotor, the asymmetries of said elements being maintained generally in opposite phase relationship during normal power-on operation of said rotors, and mechanism interconnected with the engine controls and responsive to said asymmetrical elements, said mechanism being adapted to shut off the engine when the asymmetries of said elements come generally into the same phase relationship.

3. In a helicopter having an engine, a pair of side-by-side sustaining rotors, integrated transmission means extending from said engine to each of said rotors whereby said rotors are adapted to be rotated by said engine at equal speed, and an overrunning clutch operatively disposed intermediate said engine and said rotors whereby said rotors are free to continue in autorotative rotation upon stopping of the engine; means for automatically shutting off the engine upon failure of the transmission to either rotor, said last-mentioned means including a contact ring adapted for rotation with each rotor, each of said rings having an insulating portion and a generally smaller conducting portion, the conducting portions of the two rings being disposed generally in opposite phase relationship during normal operation of said rotors, fixed electrical contacts disposed in operative juxtaposition with each of said rings, said fixed electrical contacts being connected in a series circuit which is open at all times during normal operation of said rotors, the fixed contacts touching the conducting portions of the respective rings at alternate spaced time intervals during said normal operation, the conducting portions of said conducting means being adapted to move into the same phase relationship upon failure of the transmission to one rotor whereby the fixed contacts simultaneously touch the conducting portions of the respective rings to close the series circuit and means responsive to closing of said series circuit for shutting off the engine power.

4. In a helicopter having an engine, a pair of side-by-side sustaining rotors, intergeared transmission means extending from said engine to each of said rotors whereby said rotors are adapted to be rotated by said engine at equal speed, and an overrunning clutch operatively disposed intermediate said engine and said rotors whereby said rotors are free to continue in autorotative rotation upon stopping of the engine; means for automatically shutting off the engine upon failure of the transmission to either rotor, said last-mentioned means including a contact ring adapted for rotation with each rotor, each of said rings having an insulating portion and a generally smaller conducting portion, the conducting portions of the two rings being disposed generally in opposite phase relationship during normal operation of said rotors, fixed electrical contacts disposed in operative juxtaposition with each of said rings, said fixed electrical contacts being connected in a series circuit which is open at all times during normal operation of said rotors, the fixed contacts touching the conducting portions of the respective rings at alternate spaced time intervals during said normal operation, the conducting portions of said conducting means being adapted to move into the same phase relationship upon failure of the transmission to one rotor whereby the fixed contacts simultaneously touch the conducting portions of the respective rings to close the series circuit and switch means connected within said series circuit and adapted to shut off the engine ignition upon closing of said circuit.

5. In a helicopter having an engine, a pair of side-by-side sustaining rotors, intergeared transmission means extending from said engine to each of said rotors whereby said rotors are adapted to be rotated by said engine at equal speed, and an overrunning clutch operatively disposed intermediate said engine and said rotors whereby said rotors are free to continue in autorotative rotation upon stopping of the engine; means for automatically shutting off the engine upon failure of the transmission to either rotor, said last-mentioned means including a cam disposed for rotation with each of said rotors, the two cams being disposed generally in opposite-phase relationship during normal operation of said rotors, a cam follower disposed in operative juxtaposition with each of said cams and adapted for opposite-phase reciprocation responsive to normal rotation of said rotors and said cams, said cams being adapted momentarily to come into the same phase relationship upon failure of the transmission to one rotor thereby momentarily to produce same-phase reciprocation of said cam followers, and means responsive only to generally same-phase reciprocation of said cam followers for shutting off the engine power.

6. In a helicopter having an engine, a pair of side-by-side sustaining rotors, intergeared transmission means extending from said engine to each of said rotors whereby said rotors are adapted to be rotated by said engine at equal speed, and an overrunning clutch operatively disposed intermediate said engine and said rotors whereby said rotors are free to continue in autorotative rotation upon stopping of the engine; means for automatically shutting off the engine upon failure of the transmission to either rotor, said last-mentioned means including a cam disposed for rotation with each of said rotors, the two cams being disposed generally in opposite-phase relationship during normal operation of said rotors, said cams being adapted momentarily to come into the same-phase relationship upon failure of the transmission means to one of said rotors, and means operative only during generally same-phase rotation of said cams for shutting off the engine power.

7. In a helicopter having an engine, a pair of side-by-side sustaining rotors, intergeared transmission means extending from said engine to each of said rotors whereby said rotors are adapted to be rotated by said engine at equal speed, and an overrunning clutch operatively disposed intermediate said engine and said rotors whereby said rotors are free to continue in autorotative rotation upon stopping of the engine; means for automatically shutting off the engine upon failure of the transmission to either rotor, said last-mentioned means including a cam adapted for rotation with each of said rotors, said cams being in opposite-phase relationship during normal intergeared rotation of said rotors and being adapted momentarily to come into same-phase relationship upon failure of the transmission to one of said rotors, a cam follower disposed in operative juxtaposition with each of said cams, said cam followers being adapted for opposite-phase reciprocation during normal intergeared rotation of said rotors and being adapted for momentary same-phase reciprocation upon failure of the transmission to one of said rotors, switch means for shutting off the engine power, and means operative only during same-phase reciprocation of said cam followers for actuating said switch means.

8. In a helicopter having an engine, a pair of side-by-side sustaining rotors, intergeared transmission means extending from said engine to each of said rotors whereby said rotors are adapted to be rotated by said engine at equal speed, and an overrunning clutch operatively disposed intermediate said engine and said rotors whereby said rotors are free to continue in autorotative rotation upon stopping of the engine; means for automatically shutting off the engine upon failure of the transmission to either rotor, said last-mentioned means including a cam adapted for rotation with each of said rotors, said cams being in opposite-phase relationship during normal intergeared rotation of said rotors and being adapted momentarily to come into same-phase relationship upon failure of the transmission to one of said rotors, a cam follower disposed in operative juxtaposition with each of said cams, said cam followers being adapted for opposite-phase reciprocation during normal intergeared rotation of said rotors and being adapted for momentary same-phase reciprocation upon failure of the transmission to one of said rotors, switch means for shutting off the engine power, means operable under hydraulic pressure to actuate said switch means, and a hydraulic pressure line leading to said actuating means, said cam followers passing through said hydraulic pressure line and having ports therein, said ports being in simultaneous registration with said hydraulic pressure line only during same-phase reciprocation of said cam followers.

9. In a helicopter having an engine, a pair of side-by-side sustaining rotors, intergeared transmission means extending from said engine to each of said rotors whereby said rotors are adapted to be rotated by said engine at equal speed, and an overrunning clutch operatively disposed intermediate said engine and said rotors whereby said rotors are free to continue in autorotative rotation upon stopping of the engine; means for automatically shutting off the engine upon failure of the transmission to either rotor, said last-mentioned means including a cam adapted for rotation with each of said rotors, said cams being generally in opposite-phase relationship during normal rotation of said rotors, said cams being adapted momentarily to come into same-phase relationship upon failure of the transmission to one of said rotors, cam followers disposed in operative juxtaposition with said cams, said cam followers being adapted for opposite-phase reciprocation during normal rotation of said rotors and said cam followers being adapted for momentary same-phase reciprocation upon failure of the transmission to one of said rotors, a switch adapted to shut off the engine power upon actuation thereof, and a switch actuating shaft normally retained in inoperative position during opposite-phase reciprocation of said cam followers, said shaft being adapted to move to operative switch-actuating position upon same-phase reciprocation of said cam followers.

10. For use with a helicopter having a pair of intergeared engine-driven sustaining rotors, each provided with an overrunning clutch; means for automatically shutting off the engine upon failure of the transmission to either rotor, said last-mentioned means including an asymmetrical element disposed for rotation with each rotor, the asymmetries of said element being maintained generally in opposite phase relationship during normal power-on operation of said rotors, and mechanism interconnected with the engine controls and responsive to said asymmetrical elements whereby the engine is shut off when the asymmetries of said elements go generally into the same phase relationship.

11. For use with a helicopter having a pair of intergeared engine-driven sustaining rotors, each provided with an overrunning clutch; means for automatically shutting off the engine upon failure of the transmission to either rotor, said last-mentioned means including a contact ring adapted for rotation with each rotor, each of said rings having an insulating portion and a generally smaller conducting portion, the conducting portions of the two rings being disposed generally in opposite phase relationship during normal operation of said rotors, fixed electrical contacts disposed in operative juxtaposition with each of said rings, said fixed electrical contacts being connected in a series circuit which is open at all times during normal operation of said rotors, the fixed contacts touching the conducting portions of the respective rings at alternate spaced time intervals during said normal operation, the conducting portions of said conducting means being adapted to move into the same phase relationship upon failure of the transmission to one rotor whereby the fixed contacts simultaneously touch the conducting portions of the respective rings to close the series circuit and means responsive to closing of said series circuit for shutting off the engine power.

12. For use with a helicopter having a pair of intergeared engine-driven sustaining rotors, each provided with an overrunning clutch; means for automatically shutting off the engine upon failure of the transmission to either rotor, said last-mentioned means including a cam for rotation with each of said rotors, the two cams being disposed generally in opposite-phase relationship during normal operation of said rotors, a cam follower disposed in operative juxtaposition with each of said cams and adapted for opposite-phase reciprocation responsive to normal rotation of said rotors and said cams, said cams being adapted momentarily to come into the same phase relationship upon failure of the transmission to one rotor thereby momentarily to produce same-phase reciprocation of said cam followers, and means responsive only to generally same-phase reciprocation of said cam followers for shutting off the engine power.

13. For use with a helicopter having a pair of intergeared engine-driven sustaining rotors, each provided with an overrunning clutch; means for automatically shutting off the engine upon failure of the transmission to either rotor, said last-mentioned means including a cam adapted for rotation with each of said rotors, said cams being generally in opposite-phase relationship during normal rotation of said rotors, said cams being adapted momentarily to come into same-phase relationship upon failure of the transmission to one of said rotors, cam followers disposed in operative juxtaposition with said cams, said cam followers being adapted for opposite-phase reciprocation during normal rotation of said rotors and said cam followers being adapted for momentary same-phase reciprocation upon failure of the transmission to one of said rotors, a switch adapted to shut off the engine power upon actuation thereof, and a switch actuating shaft normally retained in inoperative position during opposite-phase reciprocation of said cam followers, said shaft being adapted to move to operative switch-actuating position upon same-phase reciprocation of said cam followers.

HAVILAND H. PLATT.

REFERENCES CITED

The following references are of record in the file of this patent:

UNITED STATES PATENTS

| Number | Name | Date |
|---|---|---|
| 2,305,389 | Pullin | Dec. 15, 1942 |